(12) United States Patent
Castellani et al.

(10) Patent No.: US 11,390,119 B2
(45) Date of Patent: Jul. 19, 2022

(54) TYRE FOR VEHICLE WHEELS

(71) Applicant: Pirelli Tyre S.p.A., Milan (IT)

(72) Inventors: Luca Castellani, Milan (IT); Thomas Hanel, Milan (IT); Luca Zoia, Milan (IT); Marco Orlandi, Milan (IT); Davide Barana, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 1024 days.

(21) Appl. No.: 16/062,041

(22) PCT Filed: Dec. 19, 2016

(86) PCT No.: PCT/IB2016/057777
§ 371 (c)(1),
(2) Date: Jun. 13, 2018

(87) PCT Pub. No.: WO2017/109672
PCT Pub. Date: Jun. 29, 2017

(65) Prior Publication Data
US 2020/0269634 A1    Aug. 27, 2020

(30) Foreign Application Priority Data
Dec. 23, 2015  (IT) ................. 102015000087513

(51) Int. Cl.
*B60C 1/00*     (2006.01)
*C08L 7/02*     (2006.01)
*C08L 97/00*    (2006.01)

(52) U.S. Cl.
CPC .......... B60C 1/0041 (2013.01); B60C 1/0016 (2013.01); B60C 1/0025 (2013.01);
(Continued)

(58) Field of Classification Search
CPC ....... B60C 1/0016; B60C 1/0041; B60C 1/00; B60C 1/0025; B60C 2001/0066;
(Continued)

(56) References Cited

U.S. PATENT DOCUMENTS 2,610,954 A    9/1952  Raff et al.
2,669,592 A *  2/1954  Macgregor ............... C08L 7/00
                                                         524/76

(Continued)

FOREIGN PATENT DOCUMENTS

CN    102718995    10/2012
CN    103756060     4/2014
(Continued)

OTHER PUBLICATIONS

Lundquist & Parkas. "Lignin phenolic group types," BioResources 6(2), 920-926. (Year: 2011).*

(Continued)

*Primary Examiner* — Angela C Scott
(74) *Attorney, Agent, or Firm* — Finnegan, Henderson, Farabow, Garrett & Dunner, L.L.P.

(57) ABSTRACT

The present invention relates to a tyre for vehicle wheels comprising at least one structural element comprising a crosslinked elastomeric material obtained by crosslinking a crosslinkable elastomeric composition comprising a predispersion of natural rubber and lignin obtained by co-precipitation from latex, where said lignin has a concentration of phenolic groups higher than 2 mmol per gram of lignin, and where said predispersion comprises an amount of said lignin such as to provide, in said crosslinkable elastomeric composition, a concentration of lignin equal to or lower than about 25 phr.

18 Claims, 2 Drawing Sheets

Figure 1:
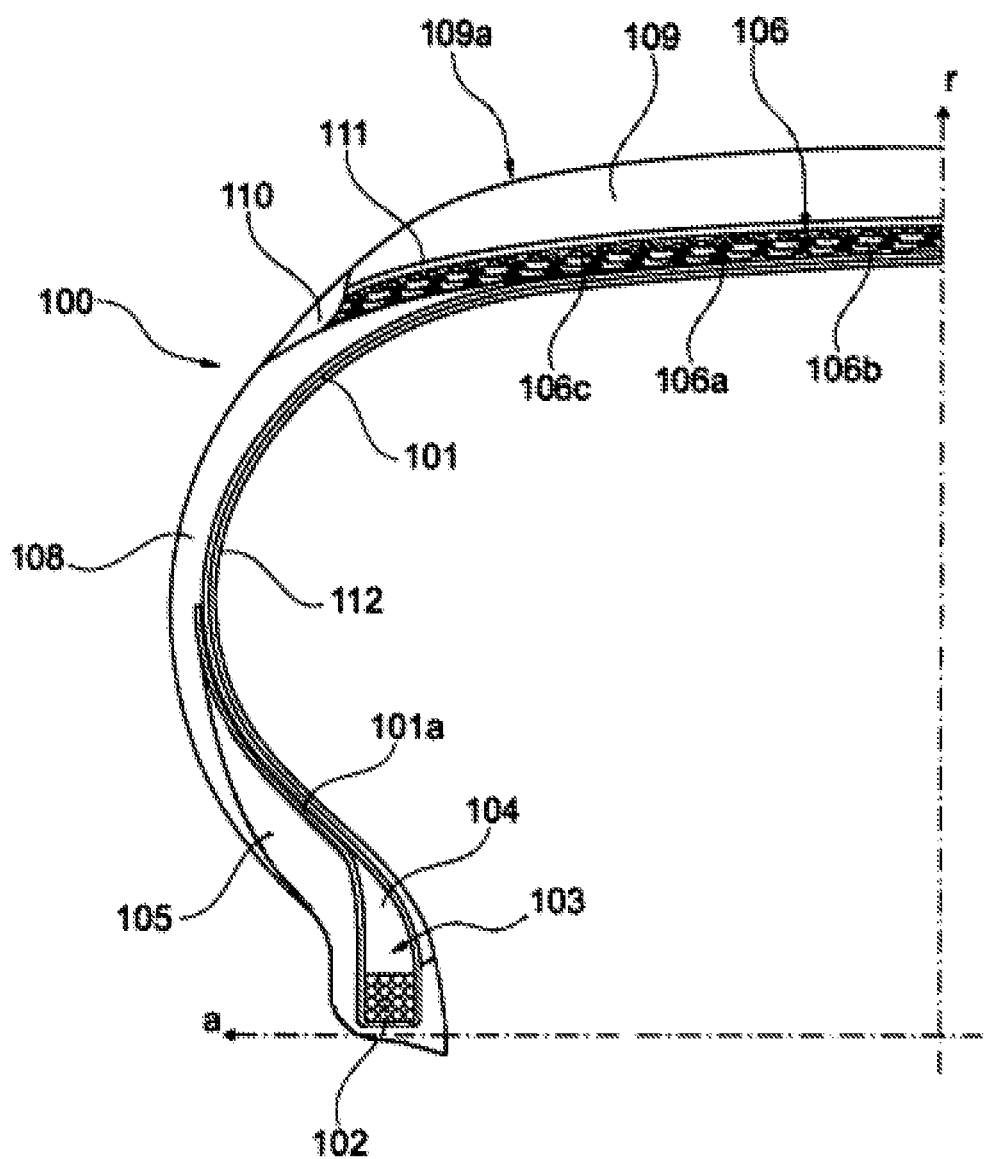

(52) U.S. Cl.
CPC ............... *C08L 7/02* (2013.01); *C08L 97/005* (2013.01); *B60C 2001/005* (2013.01); *B60C 2001/0033* (2013.01); *B60C 2001/0066* (2013.01); *C08L 2312/00* (2013.01)

(58) Field of Classification Search
CPC ....... B60C 2001/005; B60C 2001/0033; C08L 7/02; C08L 9/00; C08L 7/00; C08L 97/005; C08L 97/00; C08L 2312/00
See application file for complete search history.

(56) References Cited

U.S. PATENT DOCUMENTS

| | | |
|---|---|---|
| 2,802,815 A | 8/1957 | Doughty |
| 2,845,397 A | 7/1958 | Mills |
| 2,906,718 A | 9/1959 | Mills et al. |
| 3,079,360 A | 2/1963 | Sutherland, Jr. et al. |
| 3,163,614 A | 12/1964 | Dimitri |
| 3,282,871 A | 11/1966 | Dimitri |
| 3,296,158 A | 1/1967 | Dimitri |
| 3,345,643 A | 4/1967 | Ball |
| 3,364,158 A | 1/1968 | Griffith et al. |
| 3,817,974 A | 6/1974 | Sirianni et al. |
| 3,984,362 A | 10/1976 | Sirianni et al. |
| 3,991,022 A | 11/1976 | Dimitri |
| 2010/0204368 A1 | 8/2010 | Benko et al. |
| 2016/0230008 A1* | 8/2016 | Murai ..................... C08L 7/00 |

FOREIGN PATENT DOCUMENTS

| | | | |
|---|---|---|---|
| GB | 723751 | 2/1955 | |
| GB | 836393 | 6/1960 | |
| JP | 2008-308612 | 12/2008 | |
| JP | 2010-242023 | 10/2010 | |
| JP | 2010-248282 | 11/2010 | |
| JP | 2014-129509 | 7/2014 | |
| WO | WO 2009/145784 A1 | 12/2009 | |
| WO | WO 2014/097108 A1 | 6/2014 | |
| WO | WO-2015056757 A1 * | 4/2015 | ............ C08L 97/005 |

OTHER PUBLICATIONS

International Search Report form the European Patent Office in corresponding International Application No. PCT/IB2016/057777 dated Mar. 27, 2017.

Written Opinion of the International Searching Authority from the European Patent Office in corresponding International Application No. PCT/IB2016/057777 dated Mar. 27, 2017.

* cited by examiner

TYRE FOR VEHICLE WHEELS

This application is a national stage entry application under 35 U.S.C. § 371 based on International Application No. PCT/IB2016/057777, filed Dec. 19, 2016, and claims priority to Italian Patent Application No. 102015000000875132, filed Dec. 23, 2015; the contents of each application is incorporated herein by reference.

FIELD OF THE INVENTION

The present invention relates to a tyre for vehicle wheels. More particularly, the present invention relates to a tyre comprising at least one structural element obtained by crosslinking a crosslinkable elastomeric composition comprising a predispersion of natural rubber and lignin obtained by co-precipitation from latex.

PRIOR ART

Tyres for vehicle wheels comprising lignin are described in patent applications US2010/0204368, WO2009/145784, JP2008/308615, JP2010/242023, JP2010/248282, JP2014/129509, CN102718995, CN103756060 and in patents GB723751, GB836393, U.S. Pat. Nos. 2,610,954, 2,802,815, 2,906,718, 3,079,360, 3,163,614, 3,282,871, 3,296,158, 3,312,643, 3,364,158, 3,817,974, 3,984,362, and 3,991,022.

SUMMARY OF THE INVENTION

In the rubber industry, in particular in tyre manufacture, it is typical to use elastomeric compositions in which reinforcing fillers have been incorporated in the elastomeric polymer base, to improve the characteristics of the crosslinked products obtained, in particular the mechanical properties.

Owing to its high efficiency in reinforcement, carbon black is a reinforcing filler that is widely used. However, carbon black is a non-renewable raw material, derived mainly from processes of partial combustion of fossil fuels, primarily naphtha, methane gas, and other hydrocarbons. Moreover, carbon black may be cause for concern from the environmental standpoint since it constitutes a potential pollutant if not disposed of correctly. Replacement or reduction of the use of carbon black therefore represents an objective that is not only of interest for tyre manufacturers, but is of common interest for the general public.

In addition to carbon black, other raw materials derived from non-renewable sources, including antioxidants in particular, are used in rubber compounds for tyres.

The applicant has noted that there is a need to supply tyres and tyre components that are substantially environmentally sustainable and environmentally compatible, for example by reducing or replacing raw materials derived from petroleum with raw materials produced from renewable sources, with the aim of maintaining and possibly improving tyre performance.

Among the more abundant biopolymers from renewable sources for application in tyres, we may mention for example starch, cellulose, lignin, and hemicellulose. In the past, there have been various attempts to use some of these materials as reinforcing agents, which also have a lower specific gravity than the traditional reinforcing fillers. Lignin, for example, has been used, as it is, or modified in various ways, as reinforcing filler in rubber compounds for tyres, with poor results.

Lignin is an organic polymer complex having a three-dimensional polymeric structure consisting of phenylpropane units, and belonging to the class of the so-called phenylpropanoid compounds.

Lignins have very varied compositions and molecular weights, depending both on the biomass selected and on the process by which they are obtained. The composition varies both in terms of functional groups, mainly of the phenolic type as well as hydroxyl and carboxyl groups, and in terms of molecular weight. No precise statement about the composition of the lignins tested is given in the prior art cited above.

The applicant has also tackled the problem of ageing of vulcanized elastomeric compositions based on dienic elastomers. This ageing is associated with the thermal oxidation phenomena that occur while tyres are in use, from the combination of heat, oxygen, and mechanical stresses, and may involve an increase in stiffness of the elastomeric compositions, with a consequent decrease in mechanical strength and increased probability of crack formation and propagation.

The applicant observed that the oxidative action is more intense with an increase in temperature, and that vulcanized elastomeric compositions made from compounds with particularly high hysteresis properties (compounds that have notable dissipation of energy in the form of heat), when subjected to prolonged dynamic stresses, undergo faster processes of degradation.

Therefore when a product made from these vulcanized elastomeric compositions is subjected to the action of prolonged static and dynamic stresses and is exposed to the environmental conditions, more or less pronounced cracks may be observed to appear on its surface.

To minimize these effects, antioxidants are normally incorporated in elastomeric compositions. Antioxidants in common use are for example 1,2-dihydro-2,2,4-trimethylquinoline (TMQ), N-(1,3-dimethylbutyl)-N'-phenyl-p-phenylenediamine (DMB PP D), N-phenyl-N'-isopropyl-p-phenylenediamine (IPPD) and N-(1,3-dimethylbutyl)-N'-phenyl-phenylenediamine (6PPD), all of which are synthetic raw materials derived from non-renewable sources.

The aforementioned antioxidants based on phenylenediamine tend to migrate to exert their antiozonant surface effect, but also tend to be volatile at the typical processing temperatures of the compounds and vulcanization temperatures, and therefore it is necessary to add them to the compounds in excess, to guarantee a sufficient final residue to give protection.

A further shortcoming, generally unacceptable to the tyre's end user, is connected with the surface migration of the aforementioned antioxidants, which may cause the formation of yellowish or brown spots on the surface of a component, causing a deterioration of the tyre's appearance.

Finally, the applicant also took into account the need to have rubber compounds with high resistance to tearing, which is particularly important to guarantee tyre durability, particularly of the tread and sidewall, and observed that this property is directly related to higher values of the mechanical properties at rupture and of the energy at rupture.

The applicant has now found that it is possible to obtain crosslinkable elastomeric compositions filled with smaller amounts of carbon black, as well as with smaller amounts of antioxidants, simultaneously improving the mechanical characteristics and resistance to the processes of degradation by thermal oxidation, by adding a suitable predispersion of natural rubber and lignin obtained by co-precipitation from latex to said compositions.

The applicant found that the improvement in mechanical characteristics of the aforementioned elastomeric compositions made them particularly suitable for making elastomeric compositions for sidewall inserts (used for making self-supporting tyres, able to support the weight of the vehicle in conditions of partial or total loss of pressure) and all those tyre elements in which on the one hand we wish to reduce the increase in stiffness due to ageing of the elastomeric composition from which they are made, which leads to a reduction in resistance to cracking by bending, and on the other hand higher initial breaking strength is desired, without adversely affecting the reinforcement significantly, and at the same time lower dissipative losses of energy that contribute to increased fuel consumption and acceleration of the thermal-oxidation degradation processes. Examples of these tyre elements are belt structures, sidewall, tread band, and/or in general layers of elastomeric material in a radially inner position with respect to said tread band, bead structures, in particular the bead filler, which constitutes a transition element between the anchoring elements and the sidewall of the tyre.

In particular, the applicant has found that numerous advantages are obtained by using predispersions such as to supply the elastomeric composition with a controlled amount of lignin having a substantial concentration of phenolic groups.

Therefore, in a first aspect, the present invention relates to a tyre for vehicle wheels comprising at least one structural element comprising a crosslinked elastomeric material obtained by crosslinking a crosslinkable elastomeric composition comprising a predispersion of natural rubber and lignin obtained by co-precipitation from latex, wherein said lignin has a concentration of phenolic groups higher than 2 mmol per gram of lignin, and wherein said predispersion comprises an amount of said lignin such as to provide, in said crosslinkable elastomeric composition, a concentration of lignin equal to or lower than about 25 phr.

Preferably, said predispersion comprises an amount of said lignin such as to provide, in said crosslinkable elastomeric composition, a concentration of lignin equal to or higher than about 2.5 phr.

In particular, said tyre comprises at least one carcass structure having opposite side edges associated with respective annular reinforcing structures, a belt structure applied in a radially outer position with respect to said carcass structure, a tread band applied in a radially outer position with respect to said carcass structure, and a pair of sidewalls applied laterally on the opposite sides with respect to said carcass structure.

Advantageously, said structural element is selected from the group consisting of sidewall insert, belt structures, sidewall, tread band, layers of elastomeric material in a radially inner position with respect to said tread band, for example underlayer and mini-sidewall, and bead structures.

In a second aspect, the present invention relates to a process for preparing a predispersion of natural rubber and lignin, said process comprising: (a) adding said lignin to a latex of natural rubber, (b) causing co-precipitation (coagulation) of the predispersion of natural rubber and lignin from the mixture resulting from step (a), and (c) separating the predispersion of natural rubber and lignin obtained in step (b) from a residual supernatant.

Advantageously, the predispersion of natural rubber and lignin is obtained by adding a suitable amount of lignin to the latex of natural rubber before coagulation, thereby causing co-precipitation (coagulation) of the resultant mixture, and then separating the predispersion of natural rubber and lignin from the aqueous supernatant.

Preferably, the lignin is dissolved in an alkaline solution before it is added to the latex of natural rubber.

In particular, the alkaline solution comprises an aqueous solution of a base, preferably selected from the group comprising hydroxides of alkali metals, for example sodium hydroxide (NaOH) or potassium hydroxide (KOH), and ammonia ($NH_3$), at a concentration ranging from 0.01M to 1M, preferably from 0.1M to 0.5M. The basic conditions of the solution ensure deprotonation of the acid groups of the lignin (phenols and carboxylic acids), and the negative charges make the macromolecules of the lignin soluble and stable in aqueous solution. Addition of the lignin to the basic solution is preferably carried out with stirring and at room temperature until there is complete dissolution.

Advantageously, the latex of natural rubber may have a solid residue ranging from 20% to 70% by weight, preferably from 30% to 60% by weight, with respect to the total weight of latex.

Addition of the lignin to the latex is preferably carried out slowly, with stirring, and at room temperature, for a variable time, preferably ranging from 5 to 15 minutes, and the resultant mixture is stirred at room temperature for a variable time, preferably ranging from 1 to 2 hours.

Co-precipitation (coagulation) from the resultant mixture takes place on adding an acid solution.

In particular, the acid solution comprises an aqueous solution of an acid, preferably selected from the group comprising inorganic acids, for example hydrochloric or sulphuric acid, and organic acids, for example acetic acid, at a concentration ranging from 0.1M to 2M, preferably ranging from 0.5M to 1.5M.

Advantageously, the lignin used for the purposes of the present invention has a concentration of phenolic groups higher than 2.5 mmol per gram of lignin, and more preferably higher than 3 mmol per gram of lignin.

Preferably, the lignin used for the purposes of the present invention has a concentration of phenolic groups lower than 6 mmol per gram of lignin, and more preferably lower than 5 mmol per gram of lignin.

Advantageously, the lignin used for the purposes of the present invention has a number-average molecular weight (Mn) equal to or higher than 1,000 g/mol, more preferably equal to or higher than 2,000 g/mol, and even more preferably equal to or higher than 3,000 g/mol.

Preferably, the lignin used for the purposes of the present invention has a number-average molecular weight (Mn) equal to or lower than 10 000 g/mol, more preferably equal to or lower than 8,000 g/mol, and even more preferably equal to or lower than 5,000 g/mol.

The lignin used for the purposes of the present invention may be a commercially available lignin, for example Soda Grass lignin (Protobind® 1000 marketed by Green Value SA, Switzerland), Softwood Kraft lignin (Oxifenol® marketed by i-Green srl, Italy), and Hardwood Kraft lignin.

Advantageously, the predispersion of natural rubber and lignin comprises an amount of lignin such as to supply, in the crosslinkable elastomeric composition in which this predispersion is used, a lignin concentration ranging from 5 to 20 phr, and more preferably ranging from 6 to 15 phr.

According to a preferred embodiment, said elastomeric composition comprises at least 10 phr, preferably at least 30 phr, and more preferably at least 40 phr, of said predispersion of natural rubber and lignin obtained by co-precipitation from latex.

Moreover, a third aspect of the present invention relates to a process for manufacturing a crosslinkable elastomeric composition comprising:

feeding at least one mixing apparatus with at least the following components of a crosslinkable elastomeric composition: at least one dienic elastomeric polymer, at least one predispersion of natural rubber and lignin obtained as described above, at least one reinforcing filler, and at least one vulcanizing agent, mixing and dispersing said components so as to obtain said crosslinkable elastomeric composition, and discharging said crosslinkable elastomeric composition from said mixing apparatus.

Preferably, the crosslinkable elastomeric composition used for the purposes of the present invention comprises the predispersion of natural rubber and lignin obtained by co-precipitation from latex, and at least one elastomeric dienic polymer.

According to a preferred embodiment, the elastomeric dienic polymer that may be used in the present invention may be selected from those commonly used in elastomeric materials that are crosslinkable with sulphur, which are particularly suitable for manufacturing tyres, i.e. from elastomeric polymers or copolymers with an unsaturated chain having a glass transition temperature (Tg) generally below 20° C., preferably within the range from 0° C. to −110° C. These polymers or copolymers may be of natural origin or may be obtained by solution polymerization, emulsion polymerization or gas-phase polymerization of one or more conjugated diolefins, optionally mixed with at least one comonomer selected from monovinyl arenes and/or polar comonomers.

The conjugated diolefins generally contain from 4 to 12, preferably from 4 to 8 carbon atoms and may be selected for example from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-Butadiene and isoprene are particularly preferred.

Monovinyl arenes that may optionally be used as comonomers generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkaryl or aralkyl derivatives of styrene, for example α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl) styrene, or mixtures thereof. Styrene is particularly preferred.

Polar comonomers that may optionally be used may be selected for example from: vinylpyridine, vinylquinoline, esters of acrylic acid and alkylacrylic acid, nitriles, or mixtures thereof, for example methyl acrylate, ethyl acrylate, methyl methacrylate, ethyl methacrylate, acrylonitrile or mixtures thereof.

Preferably, the elastomeric dienic polymer that may be used in the present invention may be selected, for example, from: cis-1,4-polyisoprene (natural or synthetic, preferably natural rubber), 3,4-polyisoprene, polybutadiene (in particular polybutadiene with a high content of 1,4-cis), isoprene/isobutene copolymers, optionally halogenated; 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

The aforementioned elastomeric composition may optionally comprise at least one elastomeric polymer of one or more monoolefins with an olefinic comonomer or derivatives thereof. The monoolefins may be selected from: ethylene and α-olefins generally containing from 3 to 12 carbon atoms, for example propylene, 1-butene, 1-pentene, 1-hexene, 1-octene or mixtures thereof. The following are preferred: copolymers between ethylene and an α-olefin, optionally with a diene; homopolymers of isobutene or copolymers thereof with small amounts of a diene, which are optionally at least partly halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene or mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

It is also possible to use an elastomeric dienic polymer or an elastomeric polymer functionalized by reaction with suitable terminating agents or coupling agents. In particular, the elastomeric dienic polymers obtained by anionic polymerization in the presence of an organometallic initiator (in particular an organolithium initiator) may be functionalized by reacting the residual organometallic groups derived from the initiator with suitable terminating agents or coupling agents, for example imines, carbodiimides, alkyltin halides, substituted benzophenones, alkoxysilanes or aryloxysilanes.

According to a preferred embodiment, said elastomeric composition further comprises a carbon black reinforcing filler.

According to a preferred embodiment, the carbon black reinforcing filler that may be used in the present invention may be selected from those having a surface area of not less than 20 $m^2/g$ (determined from STSA—statistical thickness surface area according to ISO 18852:2005).

According to a preferred embodiment, the carbon black reinforcing filler is present in the elastomeric composition in an amount higher than about 15 phr, preferably higher than about 20 phr. Preferably, the carbon black reinforcing filler is present in the elastomeric composition in an amount lower than about 60 phr, preferably lower than about 50 phr.

At least one additional reinforcing filler may advantageously be added to the elastomeric composition given above, in an amount generally ranging from 1 phr to 70 phr, preferably from about 10 phr to about 60 phr. The reinforcing filler may be selected from those commonly used for crosslinked products, in particular for tyres, for example silica, alumina, aluminosilicates, calcium carbonate, kaolin or mixtures thereof.

The silica that may be used in the present invention may generally be a pyrogenic silica, or preferably a precipitated silica, with a BET surface area (measured according to standard ISO 5794/1) ranging from about 50 $m^2/g$ to about 500 $m^2/g$, preferably ranging from about 70 $m^2/g$ to about 200 $m^2/g$.

Advantageously, said crosslinkable elastomeric composition comprises a vulcanizing agent.

The crosslinkable elastomeric composition may be vulcanized by known techniques, in particular with sulphur-based vulcanizing systems commonly used for elastomeric dienic polymers. For this purpose, after one or more steps of thermomechanical processing, a sulphur-based vulcanizing agent is incorporated in the materials, together with vulcanization accelerators. In the final treatment step, the temperature is generally kept below 120° C. and preferably below 100° C., in order to avoid any undesirable phenomenon of pre-crosslinking.

Preferably, said vulcanizing agent comprises sulphur-based vulcanizing systems comprising sulphur or molecules containing sulphur (sulphur donors) together with vulcanization accelerators and/or activators known in the prior art.

The activators that are particularly effective are zinc compounds and in particular ZnO, $ZnCO_3$, zinc salts of saturated or unsaturated fatty acids containing from 8 to 18 carbon atoms, for example zinc stearate, which are preferably formed in situ in the elastomeric composition from ZnO and fatty acid, or mixtures thereof.

The accelerators that are commonly used may be selected from: dithiocarbamates, guanidine, thiourea, thiazoles, sulphenamides, thiurams, amines, xanthates or mixtures thereof.

According to a preferred embodiment, said crosslinkable elastomeric composition comprises an amount of vulcanizing agent equal to or higher than about 1 phr, preferably equal to or higher than about 2 phr.

Preferably, the amount of vulcanizing agent is equal to or lower than about 7.5 phr, preferably equal to or lower than about 7.

Advantageously the amount of sulphur is ranging from about 2 phr to about 6.5 phr.

According to a preferred embodiment, said elastomeric composition comprises a silane coupling agent able to interact with the silica optionally present as reinforcing filler and/or the silicates and bind them to the elastomeric dienic polymer during vulcanization.

According to a preferred embodiment, the silane coupling agent that may be used in the present invention may be selected from those having at least one hydrolysable silane group, which may be identified, for example, by the following general formula (II):

$(R)_3Si—C_nH_{2n}—X$ (II)

where the groups R, which may be identical or different, are selected from: alkyl, alkoxy or aryloxy groups, or from halogen atoms, provided that at least one of the groups R is an alkoxy or aryloxy group; n is an integer between 1 and 6 inclusive; X is a group selected from: nitroso, mercapto, amino, epoxide, vinyl, imide, chloro, $—(S)_mC_nH_{2n}—Si—(R)_3$ or $—S—COR$, where m and n are integers between 1 and 6 inclusive and the groups R are defined as above.

Among the silane coupling agents, those particularly preferred are bis(3-triethoxysilylpropyl) tetrasulphide and bis(3-triethoxysilylpropyl) disulphide. Said coupling agents may be used as they are or as a suitable mixture with an inert filler (for example carbon black) in order to facilitate their incorporation in the elastomeric composition.

According to a preferred embodiment, said silane coupling agent is present in the elastomeric composition in an amount ranging from 0.01 phr to about 10 phr, preferably from about 0.5 phr to about 5 phr.

Said elastomeric composition may comprise other additives commonly used, selected on the basis of the specific application for which the composition is intended. For example, the following may be added to said materials: antioxidants, anti-ageing agents, plasticizers, adhesives, antiozone agents, modifying resins, or mixtures thereof.

In particular, for the purpose of improving processability, a plasticizer may be added to said elastomeric composition, generally selected from mineral oils, vegetable oils, synthetic oils or mixtures thereof, for example aromatic oil, naphthenic oil, phthalates, soya oil or mixtures thereof. The amount of plasticizer is generally ranging from 0 phr to about 70 phr, preferably from about 5 phr to about 30 phr.

The elastomeric composition may be prepared by mixing the polymeric components with the reinforcing filler and with the other additives optionally present by techniques that are known in this field. Mixing may be carried out, for example, using an open mixer of the "open-mill" type or an internal mixer of the type with tangential rotors (Banbury®) or with intermeshing rotors (Intermix™), or in continuous mixers of the Ko-Kneader™ type or of the double-screw or multiscrew type.

DRAWINGS

Figure 2:
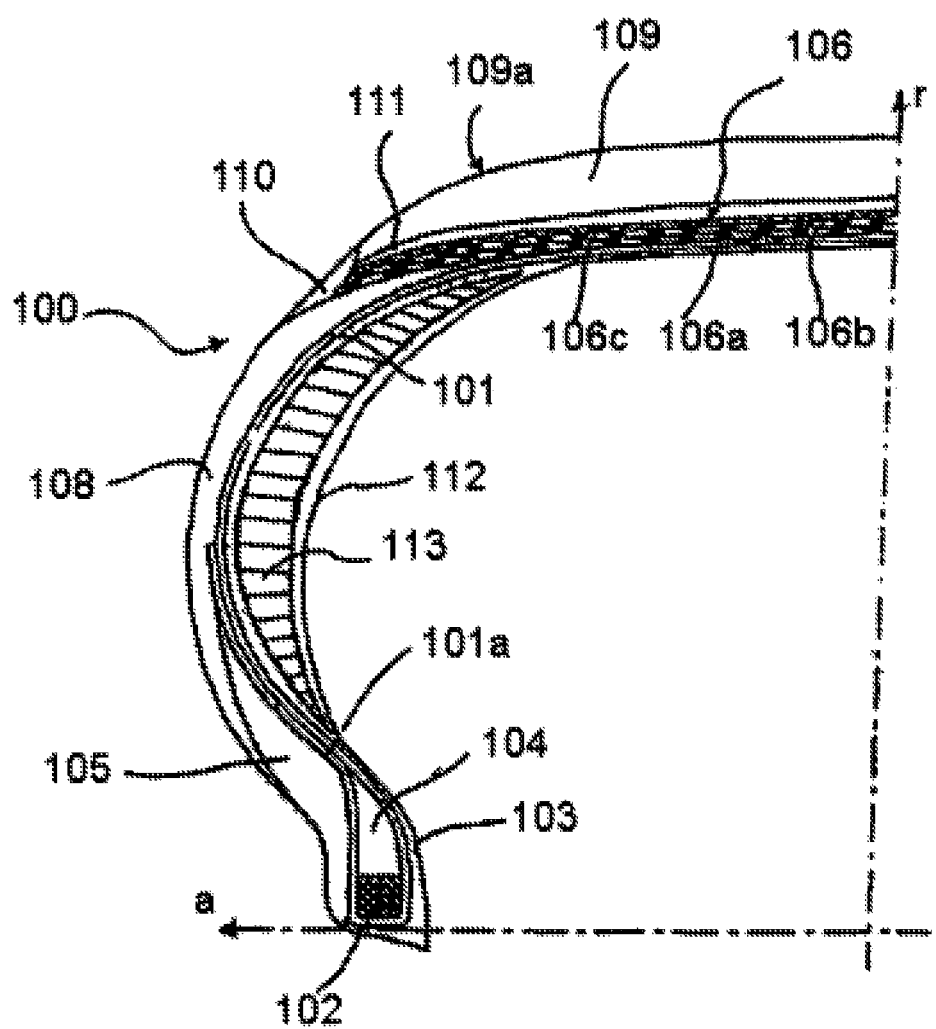

The description will be presented hereunder, referring to the appended drawings, supplied purely as a guide and therefore non-limiting, in which:

FIG. 1 illustrates, in transverse half-section, a tyre for motor vehicle wheels according to a first embodiment of the present invention, and FIG. 2 illustrates, in transverse half-section, a tyre for motor vehicle wheels according to a second embodiment of the present invention.

DETAILED DESCRIPTION OF THE INVENTION

In FIGS. 1 and 2, "a" indicates an axial direction and "r" indicates a radial direction. For simplicity, FIGS. 1 and 2 show only a portion of the tyre, the remaining portion that is not shown being identical and arranged symmetrically with respect to the radial direction "r".

Referring to FIG. 1, the tyre 100 for motor vehicle wheels comprises at least one carcass structure, comprising at least one carcass layer 101 having respectively opposite terminal edges engaged in respective annular anchoring structures 102, called bead wires, optionally associated with a bead filler 104. The region of the tyre comprising the bead wire 102 and the filler 104 forms an annular reinforcing structure 103, the so-called bead, intended for anchoring the tyre on a corresponding mounting rim (not shown).

The annular reinforcing structure 103, and in particular the bead filler 104, are advantageously made from the elastomeric composition comprising the predispersion of natural rubber and lignin described above, because these elements are particularly subject to mechanical stresses in conditions of use during rolling of the tyre, as they are directly in contact with the wheel rim, and it is necessary to limit the phenomena of ageing that lead to stiffening of the elastomeric composition.

The carcass structure is usually of the radial type, i.e. the reinforcing elements of the at least one carcass layer 101 are located on planes comprising the rotation axis of the tyre and are substantially perpendicular to the equatorial plane of the tyre. Said reinforcing elements generally consist of textile cords, for example rayon, nylon, polyester (for example polyethylene naphthalate (PEN)). Each annular reinforcing structure is associated with the carcass structure by a backward folding of the opposite side edges of the at least one carcass layer 101 around the annular anchoring structure 102 in order to form the so-called backfolds of the carcass 101a as illustrated in FIG. 1.

In one embodiment, coupling between the carcass structure and the annular reinforcing structure may be provided by a second carcass layer (not shown in FIG. 1) applied in an axially outer position with respect to the first carcass layer.

An antiabrasive strip 105 is arranged in an outer position of each annular reinforcing structure 103. Preferably each antiabrasive strip 105 is arranged at least in an axially outer position with respect to the annular reinforcing structure 103 extending at least between the sidewall 108 and the portion radially below the annular reinforcing structure 103.

Preferably the antiabrasive strip 105 is arranged so as to wrap the annular reinforcing structure 103 along the axially inner and outer regions and regions radially below the annular reinforcing structure 103 so as to be interposed between the latter and the wheel rim when the tyre 100 is mounted on the rim.

Associated with the carcass structure, there is a belt structure 106 comprising one or more belt layers 106a, 106b arranged in radial superposition relative to one another and relative to the carcass layer, having reinforcing cords, typically metallic. These reinforcing cords may have a crossed orientation relative to a circumferential direction of development of the tyre 100. "Circumferential" direction means a direction generally oriented in the direction of rotation of the tyre.

In a radially more outer position with respect to the belt layers 106a, 106b, at least one zero-degrees reinforcing layer 106c may be applied, commonly known as "0° belt", which generally incorporates a plurality of reinforcing cords, typically textile cords, oriented in a substantially circumferential direction, thus forming an angle of a few degrees (for example an angle between about 0° and 6°) relative to the equatorial plane of the tyre, and coated with an elastomeric material.

The elements of the belt structure are advantageously made from the elastomeric composition comprising the predispersion of natural rubber and lignin described above.

A tread band 109 made of an elastomeric compound is applied in a radially outer position with respect to the belt structure 106.

In addition, respective sidewalls 108 made of an elastomeric compound produced according to the present invention are applied in an axially outer position on the side surfaces of the carcass structure, each extending from one of the side edges of the tread band 109 until flush with the respective annular reinforcing structure 103.

In a radially outer position, the tread band 109 has a rolling surface 109a intended to come into contact with the ground. Circumferential grooves, which are connected by transverse recesses (not shown in FIG. 1) to define a plurality of blocks of various shapes and dimensions distributed over the rolling surface 109a, are generally provided in this surface 109a, which is shown smooth in FIG. 1 for simplicity.

An underlayer 111 is arranged between the belt structure 106 and the tread band 109.

A strip consisting of elastomeric material 110, commonly known as a "mini-sidewall", may optionally be present in the connecting region between the sidewalls 108 and the tread band 109, this mini-sidewall generally being obtained by co-extrusion with the tread band 109 and giving an improvement of the mechanical interaction between the tread band 109 and the sidewalls 108. Preferably the end portion of the sidewall 108 directly covers the side edge of the tread band 109.

The tread band, and/or the underlayer, and/or the mini-sidewall and/or the sidewall may advantageously be made from the elastomeric composition comprising the predispersion of natural rubber and lignin described above, because lower hysteresis means lower dissipation of energy in the form of heat during operation, and consequently lower fuel consumption, and moreover because higher energy at rupture confers higher tearing resistance, and consequently higher strength and durability of the surface of the sidewall and of the tread, which are particularly exposed to harsh mechanical stresses during use (due for example to roughness of the road surface, striking pavements when manoeuvring for parking, and so on).

In the case of tubeless tyres, a layer of rubber 112, generally known as a "liner", which provides the necessary impermeability to the air for inflating the tyre, may also be provided in a radially inner position with respect to the carcass layer 101.

Self-supporting tyres (100), illustrated in FIG. 2, include a supporting structure that is able to support the load of the vehicle when there is considerable or total loss of pressure. In particular, a sidewall insert (113), made according to the present invention, may be associated with each sidewall. On each side of the self-supporting tyre (100), the sidewall insert (113) extends radially between the relevant bead structure (103) and the corresponding side edge of the tread band (109). Each sidewall insert (113) may be made of one or more portions and is arranged in an axially inner or outer position with respect to the carcass ply. For example, as shown in FIG. 2, the sidewall insert (113) is arranged between the carcass ply (101) and the liner (112).

As an alternative, in the case when there is more than one carcass ply, a sidewall insert (113) may be arranged between two of said carcass plies (not shown in FIG. 2).

As an alternative, a sidewall insert (113) may be arranged between the carcass ply and the sidewall (not shown in FIG. 2).

The sidewall insert is advantageously made of the elastomeric composition comprising the predispersion of natural rubber and lignin described above, because in the working conditions with the tyre deflated it must have good resistance to propagation of tearing (obtainable when there are higher rupture properties, and especially elongation at break), and reduced dissipation of heat (obtainable when there is lower hysteresis).

According to an embodiment that is not shown, the tyre may be a tyre for wheels for heavy vehicles, such as lorries, buses, trucks, vans, and in general for vehicles in which the tyre is subjected to a high load.

Manufacture of the tyres 100 as described above may be carried out by assembling the respective semifinished products on a building drum (not shown), by means of at least one assembly device.

At least a part of the components intended to form the carcass structure of the tyre may be constructed and/or assembled on the building drum. More particularly, the building drum is intended to receive firstly the optional liner, then the carcass structure and the antiabrasive strip. Next, devices that are not shown engage, coaxially around each of the terminal edges, one of the annular anchoring structures, position an outer sleeve comprising the belt structure and the tread band in a position coaxially centred around the cylindrical carcass sleeve and form the carcass sleeve in a toroidal configuration by stretching the carcass structure radially, in order to ensure that it is applied against a radially inner surface of the outer sleeve.

Following building of the raw tyre, a treatment of moulding and vulcanizing is carried out in order to provide structural stabilization of the tyre by crosslinking the elastomeric compound as well as impress a desired tread pattern on the tread band and optionally impress distinctive graphical symbols on the sidewalls.

The present invention will be further illustrated below with a number of examples of preparation, which are supplied purely as a guide and without any limitation of this invention.

Example 1

Characterization of the Lignins Used in the Examples

Five different lignins (Soda Grass, Softwood Kraft, Hardwood Kraft, Wheat Straw and Rice Husk) were tested for carrying out the present invention.

Soda Grass lignin is a lignin extracted from annual plants, for example agricultural waste, by a process that uses sodium hydroxide. The lignin used is marketed by Green Value and is designated Protobind 1000®.

Softwood Kraft lignin is a lignin obtained as a by-product of the Kraft process used for producing cellulose starting from conifers; in particular, a lignin designated Oxifenol® marketed by i-Green srl was used.

Hardwood Kraft lignin is also produced by the Kraft process but using lignocellulosic material obtained from broad-leaved plants.

Wheat Straw lignin is obtained from the purification of a by-product of the process for producing bioethanol starting from annual plants of the *Arundo donax* or wheat straw type, as described in patent WO 2011/007369 in the name of Chemtex.

However, Rice Husk lignin has been extracted in the laboratory from rice husks, a by-product of the food and agriculture industry.

Table 1 below summarizes the main characteristics of the lignin used.

TABLE 1

| Lignin | Soda Grass | Softwood Kraft | Hardwood Kraft | Wheat Straw | Rice Husk |
|---|---|---|---|---|---|
| Molecular weights (g/mol) | | | | | |
| Number-average molecular weight (Mn) g/mol | 1000 | 4700 | 3700 | 4400 | 5500 |
| Molecular weight of the most abundant fraction (Mp) g/mol | 700 | 1450 | 2500 | 2000 | 2100 |
| Polydispersity index (D) | 2.5 | 5.7 | 2.1 | 2.7 | 3.5 |
| Functional groups (mmol/g) | | | | | |
| Aliphatic alcohols | 1.69 | 2.23 | 1.24 | 1.84 | 1.95 |
| Total phenols | 3.46 | 4.83 | 2.57 | 1.77 | 0.94 |
| Carboxylic acids | 1.07 | 0.59 | 0.48 | 0.51 | 0.52 |

The molecular weights were characterized by GPC (gel permeation chromatography). The lignins were functionalized chemically (acetylation) to make them soluble in the solvent used in the instrument (THF), then the various fractions were separated by a column with variable porosity, and the molecular weight of the various fractions was quantified by comparing with a standard of known molecular weight. The parameter most used for describing the distribution of the molecular weights of a polymer is the number-average molecular weight $M_n$, which is the average of the molecular weights of the polymer chains calculated as follows:

$$M_n = \frac{\Sigma M_i N_i}{\Sigma N_i}$$

where $M_i$ represents the molecular weight and $N_i$ the number of chains.

The functional groups were characterized by $^{31}$P-NMR. The various hydroxyls of the lignin are functionalized by reaction with TMDP (2-chloro-4,4,5,5-tetramethyl-1,3,2-dioxaphospholane) and quantified by NMR analysis.

Example 2

Preparation of the Predispersion of Natural Rubber Containing Lignin

Various predispersions of natural rubber were prepared containing 15 phr of various types of lignin (Soda Grass, Softwood Kraft, Hardwood Kraft, Wheat Straw and Rice Husk) and different amounts (7, 15 and 45 phr) of Softwood Kraft lignin.

The procedure comprises a first step of dissolution of the lignin at room temperature in alkaline solution, followed by the step of adding the lignin solution thus obtained to latex of natural rubber, and finally the step of coagulation by adding organic or inorganic acids.

Dissolution of the lignin was effected with a 0.1M solution of sodium hydroxide (NaOH), in an amount of about 10 ml per gram of lignin. Dissolution was carried out at room temperature (about 20° C.), adding the lignin to the alkaline solution, with stirring. When all the lignin had been added, the mixture was stirred until the lignin had dissolved completely.

The latex of natural rubber was prepared separately. The latex used, of Thailand provenance, consisted of a latex concentrated by centrifugation to 60% of solid rubber residue and stabilized with ammonia, produced and marketed by the company Von Bundit Co., Ltd.

The latex was stirred at room temperature for several minutes in a suitable vessel, and then, while still stirring, the lignin solution previously obtained was poured in slowly.

The mixture thus obtained was stirred vigorously at room temperature for a period of time ranging from 1 to 2 hours.

At the end of this period, the coagulation step was started by acidifying the solution by adding a 10% solution of sulphuric acid ($H_2SO_4$). Acidification causes co-precipitation of the natural rubber and lignin, leaving a relatively clear and transparent supernatant.

The precipitate of natural rubber and lignin was filtered and washed to remove the residual salts and the excess acid, then reduced to a thin foil, about 1 cm thick. The foil was then dried by exposure to the air at room temperature away from the light for 24 hours, and then dried in the stove at 35° C. under vacuum for 12 hours.

Following the procedure described above, the predispersions were prepared with the amounts of natural rubber and the amounts and types of lignin shown in Table 2 below.

TABLE 2

| Predispersion | Amount of natural rubber | Type of lignin | Amount of lignin |
|---|---|---|---|
| 1 | 100 | Rice Husk | 15 |
| 2 | 100 | Wheat Straw | 15 |
| 3 | 100 | Hardwood Kraft | 15 |
| 4 | 100 | Soda Grass | 15 |
| 5 | 100 | Softwood Kraft | 15 |
| 6 | 100 | Softwood Kraft | 7 |
| 7 | 100 | Softwood Kraft | 45 |

Example 3

Preparation of the Compounds Using the Predispersions of Natural Rubber Containing Lignin Prepared in Example 2

The predispersions described above were used, as crude pastes, for preparing the compounds in Table 3, which also describes a reference compound (R) comprising only natural rubber, and a comparative compound (C) with pure natural rubber added, after coagulation from latex, with 15 phr of Softwood Kraft lignin directly, both in the mixing step.

The compounds were prepared in a Brabender internal mixer with a cubic capacity of 50 cm$^3$ and a filling factor of 0.9. The chamber and the rotors of the mixer were set at an initial temperature of 60° C., and the rotary speed of the rotors was set at 70 rpm.

At zero minute (0'), loading of the appropriate predispersion or natural rubber, depending on the compound, was begun. In the case of compound (C), at the third minute (3') the lignin was added in the form of powder. At the fourth minute (4'), the vulcanizing agents were added, consisting of soluble sulphur, stearic acid, zinc oxide and CBS (N-cyclohexyl-2-benzothiazole sulphenamide), according to the formulations given in Table 3 below. At the eighth minute (8') the compound was discharged and left to cool.

It can be seen from the results of the tensile tests presented in Table 4 that the best results were obtained with predispersions 3, 4 and 5 comprising respectively 15 phr of Hardwood Kraft, Soda Grass and Softwood Kraft lignin, and that good results are also obtained with predispersion 6 comprising 7 phr of Softwood Kraft lignin. These lignins endow the compounds with excellent rupture properties and superior resilience and reinforcement.

The best properties are obtained with Softwood Kraft lignin, contained in compounds 5 and 6. Hardwood Kraft lignin, contained in compound 3, gave it similar but slightly poorer characteristics, while Soda Grass, contained in compound 4, maintained a good result in elongation, but gave it a lower breaking load.

On the contrary, it was observed from the results of the tensile tests on predispersions 1 and 2, comprising 15 phr of Rice Husk and Wheat Straw lignin respectively, that such lignins had an adverse effect on the rupture properties of the compound.

Comparing the results for compound 5, comprising the predispersion with co-precipitated Softwood Kraft lignin, with the results for the comparative compound C, comprising an equal amount of Softwood Kraft lignin that was not co-precipitated, but added to the coagulated rubber in the mixing step, it was observed that the co-precipitation method gave compounds with definitely superior properties.

Comparing the results for compounds 5, 6 and 7, comprising the predispersions with variable amounts of Softwood Kraft lignin, it was observed that by increasing the loading from 7 to 15 phr there is an improvement of the loads at the various strains and a decrease of little significance in elongation at break. If, however, the loading is

TABLE 3

| | Compounds | | | | | | | | |
|---|---|---|---|---|---|---|---|---|---|
| | 1 | 2 | 3 | 4 | 5 | 6 | 7 | R | C |
| Predispersion | 1 | 2 | 3 | 4 | 5 | 6 | 7 | — | — |
| Natural rubber | 100 | 100 | 100 | 100 | 100 | 100 | 100 | 100 | 100 |
| Lignin | 15 | 15 | 15 | 15 | 15 | 7 | 45 | 0 | 15 |
| Sulphur | 2 | 2 | 2 | 2 | 2 | 2 | 2 | 2 | 2 |
| ZnO | 5 | 5 | 5 | 5 | 5 | 5 | 5 | 5 | 5 |
| Stearic acid | 2 | 2 | 2 | 2 | 2 | 2 | 2 | 2 | 2 |
| CBS | 2 | 2 | 2 | 2 | 2 | 2 | 2 | 2 | 2 |

Measurements by MDR (Moving Die Rheometer) were performed on the crude compounds to verify their cross-linking kinetics. MDR rheometry analysis was carried out using a Monsanto MDR rheometer. The test was performed at 170° C. for 20 minutes with an oscillation frequency of 1.66 Hz (100 oscillations per minute) and an oscillation amplitude of ±0.5°. The values of minimum torque (ML) and maximum torque (MH) were measured. The results obtained are given in Table 4.

The crude compounds were then vulcanized at 151° C. for 30 min and then Dumbbell test specimens were punched out.

The static mechanical properties according to standard UNI 6065:2001 were measured at different elongations (10%, 50%, 100% and 300%) on the aforementioned Dumbbell test specimens. The results obtained are given in Table 4.

TABLE 4

| | Compounds | | | | | | | | |
|---|---|---|---|---|---|---|---|---|---|
| | 1 | 2 | 3 | 4 | 5 | 6 | 7 | R | C |
| MDR MEASUREMENTS | | | | | | | | | |
| ML [dN m] | 1.17 | 1.3 | 1.16 | 1.25 | 1.35 | 0.91 | 0.92 | 1.08 | 0.86 |
| MH [dN m] | 7.87 | 8.9 | 9.06 | 6.72 | 8.06 | 9.74 | 3.33 | 9.16 | 6.63 |
| TS2 [min] | 2.94 | 3.36 | 6.4 | 2.5 | 2.66 | 8.81 | 4.2 | 3.7 | 1.71 |
| T90 [min] | 5.5 | 6.72 | 10.46 | 5.74 | 6.25 | 13.41 | 4.99 | 7.33 | 3.99 |
| T100 [min] | 12.42 | 13.59 | 16.98 | 59.95 | 18.93 | 24.62 | 11.43 | 29.58 | 9.6 |
| % RET [%] | 4.48 | 7.63 | 10.63 | 0.18 | 4.17 | 9.06 | 22.41 | 6.56 | 6.93 |
| STATIC MECHANICAL PROPERTIES | | | | | | | | | |
| Ca0.1 [MPa] | 0.29 | 0.29 | 0.30 | 0.28 | 0.29 | 0.26 | 0.55 | 0.23 | 0.27 |
| Ca0.5 [MPa] | 0.75 | 0.77 | 0.75 | 0.74 | 0.75 | 0.69 | 1.33 | 0.68 | 0.72 |
| Ca1 [MPa] | 1.16 | 1.24 | 1.16 | 1.17 | 1.18 | 1.04 | 2.06 | 1.07 | 1.08 |
| Ca3 [MPa] | 4.07 | 4.95 | 4.25 | 4.32 | 4.5 | 3.06 | 5.25 | 3.25 | 3.23 |
| CR [MPa] | 17.21 | 15.67 | 23.25 | 20.78 | 23.76 | 22.95 | 15.77 | 15.00 | 14.39 |
| AR [%] | 497.15 | 486.51 | 591.84 | 571.79 | 577.3 | 595.5 | 541.44 | 586.00 | 521.09 |
| ENERGY[J/cm$^3$] | 23.26 | 23.2 | 39.16 | 36.81 | 40.53 | 33.95 | 32.2 | — | 20.98 | increased excessively, to 45 phr, deterioration of the mechanical properties is observed instead, which can be linked to non-optimum vulcanization, evidenced by the low torque values (MH) obtained during the vulcanization step.

Example 4

Preparation of a Compound for a Tyre Sidewall Insert Using a Predispersion of Natural Rubber Containing Softwood Kraft Lignin A predispersion of natural rubber containing 15 phr of Softwood Kraft lignin prepared as predispersion 5 in example 2 was used for preparing compounds 1 and 2 in Table 5.

The reference compound R comprised only natural rubber coagulated from latex, 17 phr of carbon black and a complete antioxidant system comprising 1 phr of TMQ and 1.5 phr of 6PPD.

The comparative compound C comprised only natural rubber, 11 phr of carbon black (6 phr less than reference R) and a complete antioxidant system comprising 1 phr of TMQ and 1.5 phr of 6PPD.

The compound used for the purposes of the invention 1, comprised 60 phr of natural rubber, 46 phr of predispersion 5 (40 phr of natural rubber and 6 phr of Softwood Kraft lignin), 11 phr of carbon black (6 phr less than reference R), and a complete antioxidant system comprising 1 phr of TMQ and 1.5 phr of 6PPD.

The compound used for the purposes of the invention 2, comprised 60 phr of natural rubber, 46 phr of predispersion 5 (40 phr of natural rubber and 6 phr of Softwood Kraft lignin), 11 phr of carbon black (6 phr less than reference R), and an antioxidant system comprising only 0.5 phr of TMQ and 0.5 phr of 6PPD.

The complete composition of the four compounds is presented in Table 5 below.

The four compounds illustrated in Table 5 were prepared as follows (the amounts of the various components are given in phr), working in a 1.6-litre Banbury mixer.

All the components of the first phase were mixed in the Banbury mixer. As soon as the temperature reached 140°±5° C., the elastomeric composition was discharged. After it had been left to stand for a day, the compound was put back in the Banbury, adding the components of the second phase, and discharging when the temperature reached 120°±5° C. Finally, the ingredients of the third phase were added, discharging at a temperature not above 120° C.

TABLE 5

| INGREDIENTS | COMPOUND | | | |
|---|---|---|---|---|
|  | R | C | 1 | 2 |
| FIRST PHASE | | | | |
| BR | 60 | 60 | 60 | 60 |
| TESPT(50%) | 2.4 | 2.4 | 2.4 | 2.4 |
| N550 | 18 | 18 | 18 | 18 |
| SiO2 | 20 | 20 | 20 | 20 |
| NR | 40 | 40 | — | — |
| PREDISPERSION 5 | — | — | 46 | 46 |
| BIMODAL WAX | 1 | 1 | 1 | 1 |
| N550 | 17 | 11 | 11 | 11 |
| SECOND PHASE | | | | |
| ZINC OCTOATE | 2.66 | 2.66 | 2.66 | 2.66 |
| ZINC OXIDE 80 | 5.0 | 5.0 | 5.0 | 5.0 |
| TMQ | 1.0 | 1.0 | 1.0 | 0.5 |
| 6PPD | 1.5 | 1.5 | 1.5 | 0.5 |

TABLE 5-continued

| INGREDIENTS | COMPOUND | | | |
|---|---|---|---|---|
|  | R | C | 1 | 2 |
| THIRD PHASE | | | | |
| TESPT(50%) | 2.4 | 2.4 | 2.4 | 2.4 |
| TiBTD | 1.0 | 1.0 | 1.0 | 1.0 |
| TBBS 80% | 1.88 | 1.88 | 1.88 | 1.88 |
| RHENOCURE IS90G | 2.00 | 2.00 | 2.00 | 2.00 |

BR is a polybutadiene rubber SKD with neodymium catalyst having more than 97% of cis butadiene
TESPT(50%) is a silane tetrasulphide of the Si69 type supported on carbon black
SiO2 is Zeosil 1115 MP precipitated silica with surface area of 101 m$^2$/g from Solvay
NR is natural rubber coagulated from latex concentrated to 60% of solid rubber
PREDISPERSION 5 is the predispersion of natural rubber coprecipitated with 15 phr of Softwood Kraft lignin as described in example 2
BIMODAL WAX is the antiozonant wax
N550 is carbon black (Cabot Corporation)
ZINC OCTOATE is a vulcanizing agent
ZINC OXIDE 80 is a dispersion of natural rubber with 80% of zinc oxide
TMQ is the antioxidant 2,2,4-trimethyl-1,2-diidroquinoline (Nord Chemie)
6PPD is the aromatic amine antioxidant N-(1,3-dimethylbutyl)-N'-phenyl-p-phenylenediamine (Lanxess Deutschland GmbH, Germany)
TiBTD is the accelerant tetraisobutylthiuram disulphide
TBBS 80% is a dispersion of N-tert-butyl-2-benzothiazole sulphenamide (Vulkacit® NZ/EGC, Lanxess Deutschland GmbH, Germany)
RHENOCURE IS90G is insoluble sulphur (Lanxess Deutschland GmbH, Germany)

Rheometric measurements were performed on the crude compounds at 170° C. for 10 minutes with the RPA 2000 instrument from ALPHA TECHNOLOGIES (Rubber Processing Analyzer). The results obtained are given in Table 6.

The crude compounds were then vulcanized at 170° C. for 10 min, then Dumbbell test specimens were punched out according to UNI 6065:2001.

The static mechanical properties were measured at different elongations (10%, 50%, and 100%) as described for example 3, on samples of the compounds immediately after crosslinking at 170° C. for 10 minutes, and after thermal ageing at 70° C. for 7 days (168 hours) in an air stove. The results obtained are given in Table 6.

The dynamic mechanical properties E' and Tan delta were measured using an Instron model 1341 dynamic tester in tension-compression conditions according to the following methods. A testpiece of crosslinked material (170° C. for 10 minutes) having a cylindrical shape (length=25 mm; diameter=14 mm), preloaded in compression to a longitudinal strain of 25% relative to the initial length and maintained at the set temperature (23° C. or 70° C.) throughout the test, was subjected to a dynamic sinusoidal stress having an amplitude of ±3.5% with respect to the length under preload, with a frequency of 100 Hz. The dynamic mechanical properties are expressed in terms of values of dynamic elastic modulus (E') and Tan delta (loss factor). The Tan delta value was calculated as the ratio of the viscous dynamic modulus (E") to the elastic dynamic modulus (E'). The results obtained are given in Table 6.

TABLE 6

| Properties | Compound | | | |
|---|---|---|---|---|
|  | R | C | 1 | 2 |
| RPA MEASUREMENTS | | | | |
| ML [dN m] | 2.33 | 2.13 | 2.60 | 2.64 |
| MH [dN m] | 23.15 | 21.22 | 22.30 | 23.02 |
| TS2[min] | 0.74 | 0.79 | 0.78 | 0.79 |

TABLE 6-continued

| Properties | Compound | | | |
|---|---|---|---|---|
| | R | C | 1 | 2 |
| T30[min] | 0.89 | 0.93 | 0.92 | 0.96 |
| T90[min] | 1.88 | 2.00 | 1.99 | 1.81 |
| STATIC MECHANICAL PROPERTIES ON THE FRESH MATERIAL | | | | |
| Ca0.1[MPa] | 0.62 | 0.56 | 0.62 | 0.65 |
| Ca0.5[MPa] | 1.80 | 1.56 | 1.71 | 1.87 |
| Ca1[MPa] | 3.63 | 2.95 | 3.35 | 3.76 |
| CR[MPa] | 12.97 | 13.64 | 13.36 | 14.69 |
| AR[%] | 252.94 | 300.03 | 274.56 | 268.79 |
| ENERGY[J/cm$^3$] | 14.60 | 18.04 | 16.33 | 17.63 |
| STATIC MECHANICAL PROPERTIES AFTER AGEING | | | | |
| Ca0.1[MPa] | 0.73 | 0.66 | 0.70 | 0.74 |
| Ca0.5[MPa] | 2.12 | 1.89 | 1.98 | 2.14 |
| Ca1[MPa] | 4.44 | 3.85 | 4.04 | 4.48 |
| CR[MPa] | 12.39 | 11.39 | 12.20 | 12.21 |
| AR[%] | 203.74 | 218.90 | 218.52 | 212.73 |
| ENERGY[J/cm$^3$] | 10.24 | 10.76 | 11.44 | 11.27 |
| Δ Ca0.5 [%] | +17.7 | +21.1 | +15.7 | +14.4 |
| Δ AR [%] | −19.4 | −27.0 | −20.0 | −20.8 |
| DYNAMIC MECHANICAL PROPERTIES | | | | |
| E'[MPa] 23° C., 100 Hz | 8.444 | 7.523 | 8.057 | 8.194 |
| Tan.Delta[—] | 0.111 | 0.104 | 0.105 | 0.104 |
| E'[MPa] 100° C., 100 Hz | 7.975 | 7.124 | 7.581 | 7.717 |
| Tan.Delta[—] | 0.077 | 0.070 | 0.071 | 0.070 |

The results obtained in the static tests in Table 6 demonstrated that compounds 1 and 2, prepared using the predispersion of lignin where part of the black is replaced with equal amounts of lignin, gave values of elongation and especially loads at rupture higher than the reference R, predictive of improved tearing resistance.

At the same time, the results obtained in the ageing tests in Table 6 demonstrated that the presence of lignin, introduced via the predispersion, makes it possible to guarantee a good level of resistance to thermal oxidative ageing, evidencing of similar or lower variation of the static mechanical properties after ageing.

Moreover, compounds 1 and 2 showed values of the static moduli substantially in line with the reference, and dynamic properties even better then the reference. In particular, compounds 1 and 2 showed lower hot hysteresis, which indicates a longer tyre life when running flat (run-flat) with the tyre deflated, allowing colder processing of the sidewall insert material.

Example 5

Preparation of a Tyre Sidewall Compound Using a Predispersion of Natural Rubber Containing Softwood Kraft Lignin The procedure in example 4 was repeated with a second compound with the reference R', a second comparative compound C', and a compound 3 prepared using the predispersion of lignin and comprising an antioxidant system comprising only 0.5 phr of 6PPD and free from TMQ.

The complete composition of the three compounds is described in Table 7 below.

The three compounds illustrated in Table 7 were prepared as follows (the amounts of the various components are given in phr), working in a 1.6-litre Banbury mixer.

All the components of the first phase were mixed in the Banbury mixer. As soon as the temperature reached 140°±5° C., the elastomeric composition was discharged. After it had been left to stand for a day, the compound was put back in the Banbury, adding the components of the second phase, and discharging when the temperature reached 120°±5° C. Finally, the ingredients of the third phase were added, discharging at a temperature not above 120° C.

TABLE 7

| INGREDIENTS | COMPOUND | | |
|---|---|---|---|
| | R' | C' | 3 |
| FIRST PHASE | | | |
| BR | 60 | 60 | 60 |
| TESPT(50%) | 2.4 | 2.4 | 2.4 |
| N550 | 18 | 18 | 18 |
| SiO2 | 20 | 20 | 20 |
| NR | 40 | 40 | — |
| PREDISPERSION 5 | — | — | 46 |
| BIMODAL WAX | 1 | 1 | 1 |
| N550 | 17 | 11 | 11 |
| SECOND PHASE | | | |
| ZINC OCTOATE | 2.66 | 2.66 | 2.66 |
| ZINC OXIDE 80 | 5.0 | 5.0 | 5.0 |
| TMQ | 1.0 | 1.0 | — |
| 6PPD | 1.5 | 1.5 | 0.5 |
| THIRD PHASE | | | |
| TESPT(50%) | 2.4 | 2.4 | 2.4 |
| TiBTD | 1.0 | 1.0 | 1.0 |
| TBBS 80% | 1.88 | 1.88 | 1.88 |
| RHENOCURE IS90G | 2.00 | 2.00 | 2.00 |

The crude compounds were submitted to MDR (Moving Die Rheometer) rheometric measurements using a Monsanto instrument at 170° C. for 20 minutes as described in example 3. The Mooney viscosity ML (1+4) at 100° C. was measured according to standard ISO 289-1:2005. The results obtained are given in Table 8.

The crude compounds were then vulcanized at 170° C. for 10 min, and then ring specimens according to UNI 6065: 2001 were punched out.

The static mechanical properties were measured at different elongations (50% and 100%) as described for example 3. The results obtained are given in Table 8.

The dynamic mechanical properties E' and Tan delta were measured using an Instron model 1341 dynamic tester in tension-compression conditions as described in example 4. The results obtained are given in Table 8.

The hardness in degrees IRHD (at 23° C.) was measured according to standard ISO 48:2007, on samples of the compounds immediately after crosslinking at 170° C. for 10 minutes, and after thermal ageing in the air stove at 70° C. for 168 and 336 hours. The results obtained are given in Table 8.

TABLE 8

| | Compound | | |
|---|---|---|---|
| | R' | C' | 3 |
| Mooney ML (1 + 4) 100° C. | 71.5 | 65.5 | 76.4 |
| MDR MEASUREMENTS | | | |
| ML[dN m] | 2.47 | 2.16 | 2.76 |
| MH[dN m] | 27.76 | 25.08 | 27.88 |
| TS2[min] | 1.11 | 1.13 | 1.14 |

TABLE 8-continued

|  | Compound | | |
| --- | --- | --- | --- |
|  | R' | C' | 3 |
| T90[min] | 3.47 | 3.57 | 3.71 |
| T100[min] | 19.98 | 19.99 | 19.97 |
| % RET[%] | 0.04 | 0.04 | 0.04 |
| STATIC MECHANICAL PROPERTIES | | | |
| Ca0.5[MPa] | 2.04 | 1.76 | 1.98 |
| Ca1[MPa] | 4.31 | 3.55 | 4.05 |
| CR[MPa] | 9.00 | 8.59 | 9.37 |
| AR[%] | 182.87 | 203.35 | 192.08 |
| ENERGY[J/cm$^3$] | 7.16 | 7.53 | 7.94 |
| IRHD | 71.9 | 69.4 | 72.9 |
| DYNAMIC MECHANICAL PROPERTIES | | | |
| E'[MPa] 23° C., 100 Hz | 8.765 | 7.762 | 8.892 |
| Tan.Delta[—] | 0.109 | 0.103 | 0.100 |
| E'[MPa] 100° C., 100 Hz | 8.361 | 7.492 | 8.566 |
| Tan.Delta[—] | 0.075 | 0.070 | 0.069 |
| ACCELERATED AGEING | | | |
| IRHD after 168 hours, 70° C. | 76.4 | 73.9 | 76.6 |
| IRHD after 336 hours, 70° C. | 78.3 | 75.4 | 78.6 |
| ΔIRHD 168 hours | +6.20% | +6.4% | +4.80% |
| ΔIRHD 336 hours | +8.90% | +8.6% | +7.20% |

The results obtained in the static tests in Table 8 demonstrated that compound 3, prepared using the predispersion of lignin where part of the black is replaced with equal amounts of lignin, gives values of elongation and especially loads at rupture higher than the reference R', predictive of improved tearing resistance.

At the same time, the results obtained in the ageing tests in Table 8 demonstrated that the presence of lignin, introduced via the predispersion according to the invention, makes it possible to guarantee a good level of resistance to thermal oxidative ageing, with evidence of lower variation of hardness after ageing, even with greatly reduced amounts of antioxidants (TMQ and 6PPD).

The invention claimed is:

1. A tyre for vehicle wheels comprising at least a structural element comprising a crosslinked elastomeric material obtained by
    crosslinking a crosslinkable elastomeric composition comprising a predispersion of natural rubber and lignin obtained by co-precipitation from latex,
    wherein the lignin has a concentration of hydroxyl phenolic groups higher than 2 mmoles per gram of lignin, and
    wherein the predispersion comprises an amount of the lignin that provides, in the crosslinkable elastomeric composition, a concentration of lignin equal to or lower than about 25 phr.

2. The tyre for vehicle wheels according to claim 1, wherein the predispersion comprises an amount of the lignin that provides, in the crosslinkable elastomeric composition, a concentration of lignin equal to or higher than about 2.5 phr.

3. The tyre for vehicle wheels according to claim 1, wherein the tyre comprises at least a carcass structure, and a tread band applied in a radially outer position with respect to the carcass structure.

4. The tyre for vehicle wheels according to claim 1, wherein the structural element is selected from the group consisting of sidewall inserts, belt structures, sidewall, tread band, bead structures, and a layer of elastomeric material in a radially inner position with respect to the tread band.

5. The tyre for vehicle wheels according to claim 1, wherein the lignin has a concentration of hydroxyl phenolic groups higher than 2.5 mmoles per gram of lignin.

6. The tyre for vehicle wheels according to claim 5, wherein the lignin has a concentration of hydroxyl phenolic groups lower than 6 mmoles per gram of lignin.

7. The tyre for vehicle wheels according to claim 1, wherein the lignin has an number-average molecular weight (Mn) equal to or higher than 1,000 g/mole.

8. The tyre for vehicle wheels according to claim 7, wherein the lignin has an number-average molecular weight (Mn) equal to or lower than 10,000 g/mole.

9. The tyre for vehicle wheels according to claim 1, wherein the elastomeric composition comprises at least 10 phr of the predispersion of natural rubber and lignin obtained by co-precipitation from latex.

10. The tyre for vehicle wheels according to claim 1, wherein the predispersion of natural rubber and lignin comprises an amount of the lignin, that provides, in the crosslinkable elastomeric composition, a concentration of lignin ranging from 5 to 20 phr.

11. The tyre for vehicle wheels according to claim 1, wherein the predispersion of natural rubber and lignin is obtained with a process comprising: (a) adding the lignin to a latex of natural rubber, (b) causing the co-precipitation of the predispersion of natural rubber and lignin from the mixture resulting from step (a), and (c) separating the predispersion of natural rubber and lignin obtained in step (b) from a supernatant residue.

12. The tyre for vehicle wheels according to claim 11, wherein the lignin, before the addition to the latex of natural rubber, is solubilized in an alkaline solution.

13. The tyre for vehicle wheels according to claim 11, wherein the latex of natural rubber has a solid residue ranging from 20% to 70% by weight with respect to the total weight of latex.

14. The tyre for vehicle wheels according to claim 11, wherein the lignin is added in an amount that provides, in the crosslinkable elastomeric composition, a concentration of lignin ranging from 2.5 to 25 phr.

15. A process for preparing a predispersion of natural rubber and lignin, the process comprising:
    (a) adding the lignin to a latex of natural rubber,
    (b) causing co-precipitation of the predispersion of natural rubber and lignin from the mixture resulting from step (a), and
    (c) separating the predispersion of natural rubber and lignin obtained in step (b) from a residual supernatant,
    wherein the lignin has a concentration of hydroxyl phenolic groups higher than 2 mmoles per gram of lignin.

16. The process according to claim 15, wherein the lignin, before the addition to the latex of natural rubber, is solubilized in an alkaline solution.

17. The process according to claim 15, wherein the co-precipitation occurs by addition of an acid solution.

18. A process for manufacturing a crosslinkable elastomeric composition, the process comprising:
    feeding at least one mixing apparatus with at least the following components of a crosslinkable elastomeric composition: at least one dienic elastomeric polymer, at least one predispersion of natural rubber and lignin obtained according to claim 15, at least one reinforcing filler, and at least one vulcanizing agent,
    mixing and dispersing the components to obtain the crosslinkable elastomeric composition, and discharging the crosslinkable elastomeric composition from the mixing apparatus.

* * * * *